UNITED STATES PATENT OFFICE.

XENOPHON KUZMIER, OF HARTSDALE, NEW YORK.

PREPARED FOOD AND PROCESS FOR MAKING THE SAME.

1,273,072.   Specification of Letters Patent.   Patented July 16, 1918.

No Drawing.   Application filed May 7, 1918.   Serial No. 233,069.

*To all whom it may concern:*

Be it known that I, XENOPHON KUZMIER, a citizen of the United States, and a resident of Hartsdale, in the county of Westchester and State of New York, have invented new and useful Improvements in Prepared Food and Processes for Making the Same, of which the following is a specification.

This invention relates to a prepared food and process for making the same. The invention resides both in the new finished product and the process or method by which the food is produced.

An important object of the invention is to provide a process of the above named character by which a food product may be prepared from any desired food solid regardless of whether or not the food solid be of an animal or a vegetable composition.

A further object of the invention is to provide in a process of the above named character a means whereby the constituents of the food solid will retain during the process of concentration their distinctive chemical characteristics.

A further object of the invention is to provide a process by which a concentrated food may be produced which will require but little time to prepare for edible purpose.

A further object of the invention is to provide a process for producing a concentrated food which will possess its natural color and flavor when prepared for an edible purpose.

A further object of the invention is to provide a food which when prepared under my process will be greatly reduced in size and weight, but which will upon final preparation by the consumer for an edible purpose resume its original shape, size and weight thereby rendering the food identical to its original physical characteristics.

A still further object of the invention is to provide an article not only superior to anything of the kind heretofore produced but one which can be supplied to the consumer at a lower price than the article in its original form can be procured and prepared by them ready for use.

It is commonly known that any food solid, whether it be of an animal or a vegetable composition, comprises certain matter which is soluble in heated water and certain matter which on the other hand is insoluble in heated water. When I refer therefore to solubility or insolubility hereafter it shall be deemed that I speak with reference only as to heated water as the solvent.

It has been found essential in the carrying out of my process that substantially the entire amount of soluble matter contained within a food solid, whether the food solid be that of an animal or a vegetable composition, be put into solution thereby separating the soluble matter of a certain food solid from the insoluble matter. To accomplish this separation I cook the food solid in water for a sufficient period of time to dissolve substantially the entire quantity of soluble matter, the quantity of water thus employed being slightly greater in volume than is necessary to dissolve the entire amount of soluble matter. Because of the fact that a quantity of water is employed which is capable of dissolving even more soluble matter than is contained within the food solid, the solvent employed is therefore less than normally saturated.

In the carrying of my process into effect it is highly important that the food solid be of such a size as to not only render uniform cooking possible but also to allow the water in which the food solid is being cooked to penetrate the solid to the center thereof in order that the entire amount of soluble matter may be dissolved and thereby separated from the insoluble matter. It necessarily follows that if the food solids are of a large character whether they be of an animal or vegetable composition they must be cut into suitable size pieces. For example, should it be desired to prepare a concentrated turnip food the turnips are cut into pieces of a desired size. If, however, the original food solid which is used is for example, rice, the rice is of course left in its original size. And so it is with the food solids of an animal composition. For example, should it be desired to prepare a concentrated beef food product, the beef is cut into suitable size pieces, while on the other hand for example shrimp, from which it may be desired to prepare a concentrated shrimp food product, may be left in their natural size.

The period of time necessary to cook a certain solid depends upon the nature of the food solid. If the food solid be for example cabbage the time required for the cooking thereof would not be the same as that required for a meat as for example beef. In any event however, the cooking extends over a sufficient period of time to dissolve the soluble matter of the food solid, during which time any desired spices may be added for seasoning the final product.

The next step in the process is to remove the food solid from the water in which it has been cooked, the water containing in solution the soluble matter which has been extracted from the original food solid, which extracted soluble matter together with the water containing the same may be termed a solution and hereinafter referred to as such.

Upon separating the food solid from the solution the solid is placed upon trays or pans which are then placed in a drier through which preferably air currents are forced, the temperature of the drier being dependent to a certain extent upon the particular kind of food solid which is being dried therein. The food solid is left in this drier and undergoes this drying process until it is absolutely dry so as to give it great absorption qualities, the purpose of these absorption qualities being fully understood when considering the next succeeding step in the process namely, the condensation step.

In carrying out the condensation step the solution, comprising the aforesaid extracted soluble matter contained within the water in which the food solid has been cooked, is concentrated to an amount capable of being entirely absorbed by the food solid which has been dried within the hereinbefore mentioned drier. It might be well for me to mention here that the concentration is continued for a sufficient length of time to drive off substantially all of the water contained within the solution leaving a liquid which is a substantially pure extract of the particular kind of food solid which has been cooked and then dried.

Upon completion of both the drying process and the concentrating process, the next succeeding step, namely the reuniting of the dried food solid and the concentrated solution is entered upon, in which instance the dried food solid is placed in a suitable container and the concentrated liquid is poured over the same, the liquid being readily absorbed by the dried food solid due to the fact, as hereinbefore referred to, that the cooked food solid has been thoroughly dried and the solution obtained in the cooking thereof has been concentrated to such an amount as to leave an extract containing only a relative small quantity of water. In the cooking of the food, so far as has been recited, necessary condiments are added, but the principal flavoring is performed immediately after recombining the liquid extract with the dried food solid. The kind of flavoring added necessarily depends largely upon the character of the foods prepared, but such flavoring is essentially of small quantities and comprises any of the common vegetables as celery, parsley, onions, garlic, or the like in addition to the ordinary condiments as pepper, salt, mustard, etc. Upon the addition of such flavoring, the recombined food is subjected for a limited time, varying from ten to twenty minutes, to a heat approximately 160° to 210° F. for the purpose of sterilizing the same, such heat serving also to cook any added flavoring raw vegetable material and to destroy any ferments, native or foreign, to the food which, otherwise, would destroy or deteriorate the same by fermatative action.

Since by the last named step of the process the food solid and the concentrated solution are united and sterilized, there remains only one step to follow in order to obtain a finished food product comprising only the original food solid impregnated with a pure extract thereof, in which step the limited amount of water contained within the extract is expelled or driven off. This step is what might be properly termed the final drying and in the carrying out of this step the food solid having the concentrated solution absorbed therein is placed in a hot room differing from the drier hereinbefore mentioned in that the temperature of the circulating air currents employed in the hot room is less than the temperature of the air currents employed as a drying medium within the tower. It is within the hot room that the food solid having the concentrated solution absorbed therein is left until practically the entire quantity of water contained within the extract of the concentrated solution which has been absorbed by the dried food solid is expelled leaving a substantial dry food solid impregnated with a pure extract of the particular food solid employed. Some food solids, having the concentrated solution absorbed thereby, are compressed into the shape or form in which they are to be packed before they are placed in the hot room to undergo the final drying, this being done because of the fact that it is very often impractical to pack the food solids after finally dried as they become brittle which make impossible the compressing of them into desired forms.

In combinations of foods such as hash, soup, etc., the individual food solids are cooked separately and flavored. They are dried separately, and the solutions obtained are concentrated separately, but when each food solid has been sufficiently dried and each solution has been concentrated sufficiently, the food solids and the concentrated solutions are mixed together, the concentrated solutions being absorbed by the food solids as hereinbefore set forth, the final drying step then being executed by which the reunited food solids and concentrated solutions are treated collectively.

In reduction to practice, I have found that the various steps, necessary in the carrying of my process into effect, and referred to in the above description are the most effective, yet realizing that the conditions concurrent with the carrying of my process into use will necessarily vary, I desire to emphasize the fact that certain variations from the preciseness in the various steps which I have described may be executed, when necessary, without sacrificing any of the advantages of my invention as defined in the appended claims.

Having thus described my invention, what I claim as new and desire to secure and protect by United States Letters Patent, is:

1. A process of preparing food which consists in cooking food in a liquid until substantially all the soluble constituents of said food are dissolved by said liquid and extracted from said food, separating the food from the solution, reducing the solid portion to substantial dryness, concentrating said solution to an amount as will be substantially absorbed by said dried portion, combining the concentrated solution with said dried portion, subjecting the combination to a heat of approximately 160° to 210° F. for a time sufficient to sterilize the same, and thereupon reducing the sterilized combination to substantial dryness with a heat insufficient to overcook the same.

2. A process of preparing food which consists in cooking food in a liquid until substantially all the soluble constituents of said food are dissolved by said liquid and extracted from said food, separating the food from the solution, reducing the solid portion to substantial dryness, concentrating said solution to an amount as will be substantially absorbed by said dried portion, combining the concentrated solution with said dried portion, and thereupon subjecting the combination to a degree of heat sufficient to reduce the same to a condition of substantial dryness without overcooking the same.

3. A process of preparing food which consists in cooking food in a liquid until substantially all the soluble constituents of said food are dissolved by said liquid and extracted from said food, separating the food from the solution, reducing the solid portion to substantial dryness, concentrating said solution to an amount as will be substantially absorbed by said dried portion, combining the concentrated solution with said dried portion, subjecting the combination to a degree of heat of approximately 160° to 210° F. for a time sufficient to sterilize the same, and thereupon subjecting the sterilized combination to a heat to reduce the same to a condition of substantial dryness, the degree of heat for drying being insufficient to overcook the same.

4. A process of preparing food which consists in cooking food in a liquid until substantially all the soluble constituents of said food are dissolved by said liquid and extracted from said food, separating the food from the solution, reducing the solid portion to substantial dryness, concentrating said solution to an amount as will be substantially absorbed by said dried portion, combining the concentrated solution with said dried portion, adding material to flavor the combination, subjecting the combination to a heat of approximately 160° to 210° F. for a time sufficient to sterilize the same, and thereupon subjecting the sterilized combination to a degree of heat to reduce the same to substantial dryness without overcooking the same.

5. A process of preparing food which consists in cooking food with all necessary condiments in a liquid until substantially all the soluble constituents of said food are dissolved by said liquid and extracted from said food, separating the food from the solution, reducing the solid portion to substantial dryness, concentrating said solution to an amount as will be substantially absorbed by said dried portion, combining the concentrate with said dried portion, adding flavoring material to the combination to compensate for the flavoring aroma lost during the cooking of said food, applying heat, of approximately 160° to 210° F. for a time sufficient to sterilize the same, to the combination to cook the flavoring material and to sterilize the combination, thereupon subjecting the combination to a degree of heat to reduce the same to a condition of substantial dryness without overcooking the same.

6. A prepared food in a dried and substantially permanent form comprising a food substance cooked in liquid for a time sufficient to dissolve all soluble constituents, and from which said soluble extract has been removed, concentrated and recombined; and thereafter reduced to a substantial dry condition after sterilization of the same, said food being packed in a moisture-proof container and in individual quantities.

7. A prepared food in a dried and substantially permanent form comprising a food substance cooked in liquid for a time sufficient to dissolve all soluble constituents, and from which said soluble extract has been removed, concentrated and recombined, flavored and sterilized, and packed in individual quantities and moisture-proof containers.

XENOPHON KUZMIER.